United States Patent
Choi et al.

(10) Patent No.: US 10,361,417 B2
(45) Date of Patent: Jul. 23, 2019

(54) COMPOSITION FOR FORMING POROUS HEAT-RESISTANT LAYER, SEPARATOR INCLUDING THE POROUS HEAT-RESISTANT LAYER, AND ELECTROCHEMICAL BATTERY INCLUDING THE SEPARATOR

(71) Applicant: SAMSUNG SDI CO., LTD., Yongin-si, Gyeonggi-do (KR)

(72) Inventors: Jaehong Choi, Suwon-si (KR);
Changhong Ko, Suwon-si (KR);
Imhyuck Bae, Suwon-si (KR);
Dong-Wan Seo, Suwon-si (KR);
Mokyun Jin, Suwon-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 12 days.

(21) Appl. No.: 15/487,501

(22) Filed: Apr. 14, 2017

(65) Prior Publication Data

US 2017/0301903 A1    Oct. 19, 2017

(30) Foreign Application Priority Data

Apr. 14, 2016 (KR) .................. 10-2016-0045506

(51) Int. Cl.
*H01M 2/16* (2006.01)
*C09D 135/02* (2006.01)
*H01M 10/0525* (2010.01)

(52) U.S. Cl.
CPC ........ *H01M 2/1686* (2013.01); *C09D 135/02* (2013.01); *H01M 2/166* (2013.01); *H01M 10/0525* (2013.01)

(58) Field of Classification Search
CPC .... H01M 2/1653; H01M 2/145; H01M 2/166; H01M 2/1686; H01M 10/0525; H01M 10/052
(Continued)

(56) References Cited

U.S. PATENT DOCUMENTS

2011/0143183 A1* 6/2011 Matsumoto ......... H01M 2/1626
429/144
2013/0224555 A1* 8/2013 Hong .................... H01M 2/166
429/144
(Continued)

FOREIGN PATENT DOCUMENTS

| JP | 2000-188131 A | 7/2000 |
| JP | 2000-215916 A | 8/2000 |

(Continued)

OTHER PUBLICATIONS https://americas.sartomer.com/techlitdetail.asp?plid=1&sgid=5&prid=SR494 accessed Feb. 13, 2018.*
(Continued)

*Primary Examiner* — Cynthia H Kelly
*Assistant Examiner* — Rashid A Alam
(74) *Attorney, Agent, or Firm* — Lee & Morse, P.C.

(57) ABSTRACT

A composition for forming a porous heat-resistant layer of a separator, a separator, and an electrochemical battery, the composition including a monomer including a cross-linkable functional group, an oligomer including a cross-linkable functional group, a polymer including a cross-linkable functional group, or a mixture thereof; a solvent; an initiator; first inorganic particles having an average particle diameter ($D_{50}$) X of about 300 nm to about 700 nm; and second inorganics particle having an average particle diameter ($D_{50}$)
(Continued)

of 0.1X to 0.4X, wherein a weight ratio of the first inorganic particles to the second inorganic particles in the composition is about 7:3 to about 8.5:1.5.

8 Claims, 1 Drawing Sheet

(58) Field of Classification Search
USPC .......................................................... 429/144
See application file for complete search history.

(56) References Cited

U.S. PATENT DOCUMENTS

| | | | | |
|---|---|---|---|---|
| 2013/0224559 | A1* | 8/2013 | Furutani | H01M 2/145 |
| | | | | 429/145 |
| 2015/0303428 | A1* | 10/2015 | Sawada | H01M 2/1653 |
| | | | | 429/145 |

FOREIGN PATENT DOCUMENTS

| | | | |
|---|---|---|---|
| JP | 2008-210791 | A | 9/2008 |
| JP | 2011-505663 | A | 2/2011 |
| JP | 2013-149614 | A | 8/2013 |
| KR | 10-2006-0072065 | A | 6/2006 |
| KR | 10-2007-0000231 | A | 1/2007 |
| KR | 10-2008-0092832 | A | 10/2008 |
| KR | 10-2009-0056811 | A | 6/2009 |
| KR | 10-2011-0031998 | A | 3/2011 |
| KR | 10-2012-0136515 | A | 12/2012 |
| KR | 10-2013-0099592 | A | 9/2013 |
| KR | 10-2013-0118207 | A | 10/2013 |
| KR | 10-2014-0051218 | A | 4/2014 |
| KR | 10-2015-0004371 | A | 1/2015 |
| KR | 10-2015-0051556 | A | 5/2015 |
| KR | 10-2015-0088824 | A | 8/2015 |

OTHER PUBLICATIONS

Provisional double patenting rejection over claims of the above-identified application; USPTO Office action dated Feb. 23, 2018, in U.S. Appl. No. 14/984,205.

Provisional double patenting rejection over claims of the above-identified application; USPTO Office action dated Feb. 23, 2018, in U.S. Appl. No. 14/984,067.

* cited by examiner

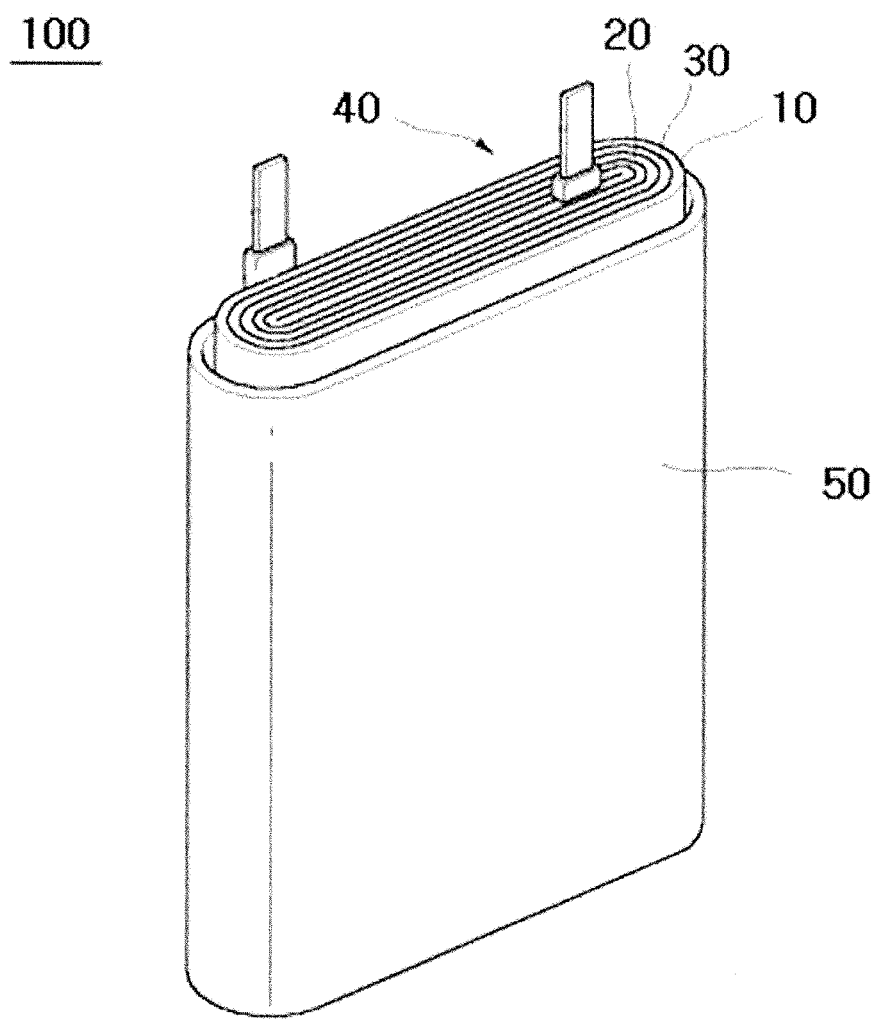

COMPOSITION FOR FORMING POROUS HEAT-RESISTANT LAYER, SEPARATOR INCLUDING THE POROUS HEAT-RESISTANT LAYER, AND ELECTROCHEMICAL BATTERY INCLUDING THE SEPARATOR

CROSS-REFERENCE TO RELATED APPLICATION

Korean Patent Application No. 10-2016-0045506, filed on Apr. 14, 2016, in the Korean Intellectual Property Office, and entitled: "Composition for Forming Porous Heat-Resistance Layer, Separator Comprising the Porous Heat-Resistance Layer, and Electrochemical Battery Using the Separator," is incorporated by reference herein in its entirety.

BACKGROUND

1. Field

Embodiments relate to a composition for forming a porous heat-resistant layer, a separator including the porous heat-resistant layer formed, and an electrochemical battery including the separator.

2. Description of the Related Art

A separator for an electrochemical battery may refer to an interlayer separating positive and negative electrodes in the battery and may maintain ion conductivity and charging and discharging the battery. When a battery is externally short-circuited, a high current may flow therein, may cause heat, may increase a battery temperature, and may start a thermal runaway. The battery could have a problem of malfunction of a safety valve, explosion, or the like due to evaporation of an electrolyte solution or heating. A separator including a porous material formed of a thermally fusible resin may be used in an effort to help address such concerns.

SUMMARY

Embodiments are directed to a composition for forming a porous heat-resistant layer, a separator including the porous heat-resistant layer formed, and an electrochemical battery including the separator.

The embodiments may be realized by providing a composition for forming a porous heat-resistant layer of a separator, the composition including a monomer including a cross-linkable functional group, an oligomer including a cross-linkable functional group, a polymer including a cross-linkable functional group, or a mixture thereof; a solvent; an initiator; first inorganic particles having an average particle diameter ($D_{50}$) X of about 300 nm to about 700 nm; and second inorganic particles having an average particle diameter ($D_{50}$) of 0.1X to 0.4X, wherein a weight ratio of the first inorganic particles to the second inorganic particles in the composition is about 7:3 to about 8.5:1.5.

The average particle diameter ($D_{50}$) of the second inorganic particles may be greater than or equal to about 50 nm.

The monomer including a cross-linkable functional group may be a monomer represented by Chemical Formula 1, the oligomer including a cross-linkable functional group may be an oligomer of the monomer represented by Chemical Formula 1, and the polymer including a cross-linkable functional group may be a polymer of the monomer represented by Chemical Formula 1:

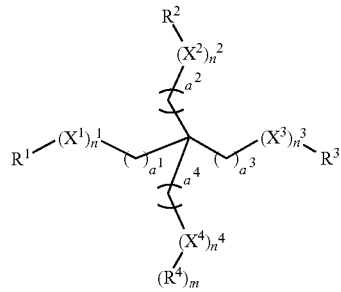

[Chemical Formula 1]

wherein, in Chemical Formula 1, $X^1$ to $X^3$ are each an oxyethylene group, $X^4$ is an oxyethylene group or a C1 to C10 alkyl group, $R^1$ to $R^4$ are each independently a (meth)acrylate group, a hydroxy group, a carboxyl group, an ester group, a cyanate group, an isocyanate group, an amino group, a thiol group, a C1 to C10 alkoxy group, a vinyl group, or a heterocyclic group, $a^1$ to $a^4$ are each independently an integer of 1 to 10, and $n^1$ to $n^4$ are each independently an integer of 0 to 10, provided that at least one of $n^1$ to $n^4$ is an integer of 1 to 10, when $X^4$ is the oxyethylene group, $n^4$ is an integer of 1 to 10 and m is 1, and when $X^4$ is a C1 to C10 alkyl group, $n^4$ is 1 and m is 0.

The composition may further include a non-cross-linking binder.

The non-cross-linking binder may include a PVdF polymer, polymethylmethacrylate, polyacrylonitrile, polyvinylpyrrolidone, polyvinylacetate, polyethyleneoxide, cellulose acetate, cellulose acetate butyrate, cellulose acetate propionate, cyanoethylpullulan, cyanoethylpolyvinyl alcohol, cyanoethyl cellulose, cyanoethylsucrose, pullulan, carboxyl methyl cellulose, an acrylonitrile-butadiene-styrene polymer, or a mixture thereof.

A weight ratio of the monomer including a cross-linkable functional group, the oligomer including a cross-linkable functional group, the polymer including a cross-linkable functional group, or the mixture thereof to the non-cross-linking binder may be about 2:8 to about 5:5.

The embodiments may be realized by providing a separator including a porous substrate; and a porous heat-resistant layer on a surface of the porous substrate, the porous heat-resistant layer being formed from the composition according to an embodiment.

The porous heat-resistant layer may include a binder having a cross-linking structure formed from a monomer represented by Chemical Formula 1, an oligomer of the monomer represented by Chemical Formula 1, a polymer of the monomer represented by Chemical Formula 1, or a mixture thereof,

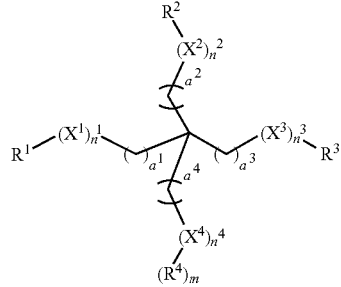

[Chemical Formula 1]

wherein, in Chemical Formula 1, $X^1$ to $X^3$ are each an oxyethylene group, $X^4$ is an oxyethylene group or a C1 to C10 alkyl group, $R^1$ to $R^4$ are each independently a (meth)acrylate group, a hydroxy group, a carboxyl group, an ester group, a cyanate group, an isocyanate group, an amino group, a thiol group, a C1 to C10 alkoxy group, a vinyl group, or a heterocyclic group, $a^1$ to $a^4$ are each independently an integer of 1 to 10, and $n^1$ to $n^4$ are each independently an integer of 0 to 10, provided that at least one of $n^1$ to $n^4$ is an integer of 1 to 10, when $X^4$ is the oxyethylene group, $n^4$ is an integer of 1 to 10 and m is 1, and when $X^4$ is a C1 to C10 alkyl group, $n^4$ is 1 and m is 0.

The embodiments may be realized by providing a separator including a porous substrate; and a porous heat-resistant layer disposed on one surface or both surfaces of the porous substrate, wherein the porous heat-resistant layer includes a cross-linking binder; a non-cross-linking binder; first inorganic particles having an average particle diameter ($D_{50}$) X of about 300 nm to about 700 nm; and second inorganic particles having an average particle diameter ($D_{50}$) of 0.1X to 0.4X, and wherein a thermal shrinkage ratio of the porous heat-resistant layer is less than or equal to about 10% when heated at about 150° C. for about 1 hour, rupture of the porous heat-resistant layer does not occur when allowed to stand for about 10 minutes at about 230° C., an elastic modulus of the porous heat-resistant layer is greater than or equal to about 500 MPa and less than or equal to about 700 MPa, and hardness of the porous heat-resistant layer is greater than or equal to about 25 N/mm² and less than or equal to about 35 N/mm².

The average particle diameter ($D_{50}$) of the second inorganic particles may be greater than or equal to about 50 nm.

The cross-linking binder may be formed from a monomer represented by Chemical Formula 1, an oligomer of the monomer represented by Chemical Formula 1, a polymer of the monomer represented by Chemical Formula 1, or a mixture thereof:

[Chemical Formula 1]

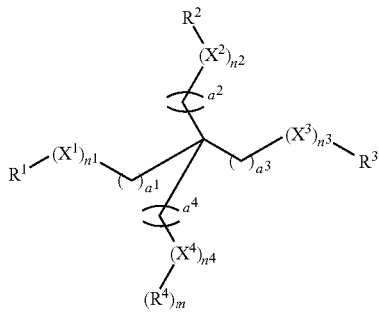

wherein, in Chemical Formula 1, $X^1$ to $X^3$ are each an oxyethylene group, $X^4$ is an oxyethylene group or a C1 to C10 alkyl group, $R^1$ to $R^4$ are each independently a (meth)acrylate group, a hydroxy group, a carboxyl group, an ester group, a cyanate group, an isocyanate group, an amino group, a thiol group, a C1 to C10 alkoxy group, a vinyl group, or a heterocyclic group, $a^1$ to $a^4$ are each independently an integer of 1 to 10, and $n^1$ to $n^4$ are each independently an integer of 0 to 10, provided that at least one of $n^1$ to $n^4$ is an integer of 1 to 10, when $X^4$ is the oxyethylene group, $n^4$ is an integer of 1 to 10 and m is 1, and when $X^4$ is a C1 to C10 alkyl group, $n^4$ is 1 and m is 0.

The non-cross-linking binder may include a PVdF polymer, polymethylmethacrylate, polyacrylonitrile, polyvinylpyrrolidone, polyvinylacetate, polyethyleneoxide, cellulose acetate, cellulose acetate butyrate, cellulose acetate propionate, cyanoethyl pullulan, cyanoethylpolyvinyl alcohol, cyanoethyl cellulose, cyanoethylsucrose, pullulan, carboxyl methyl cellulose, an acrylonitrile-butadiene-styrene polymer, or a mixture thereof.

A weight ratio of the first inorganic particles to the second inorganic particles may be about 7:3 to about 8.5:1.5.

The embodiments may be realized by providing an electrochemical battery including a positive electrode; a negative electrode; the separator according to an embodiment; and an electrolyte.

The electrochemical battery may be a rechargeable lithium battery.

BRIEF DESCRIPTION OF THE DRAWING

Features will be apparent to those of skill in the art by describing in detail exemplary embodiments with reference to the attached drawing in which:

The FIGURE illustrates an exploded perspective view of an electrochemical battery.

DETAILED DESCRIPTION

Example embodiments will now be described more fully hereinafter with reference to the accompanying drawing; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing FIGURE, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals refer to like elements throughout.

A separator according to an example embodiment may include a porous substrate and a porous heat-resistant layer disposed on one surface or both surfaces of the porous substrate.

The porous substrate may have a plurality of pores and may be a suitable porous substrate used in an electrochemical device. Examples of the porous substrate may include a polymer film formed of a polymer or a mixture of two or more of polyethylene, polypropylene, polyethyleneterephthalate, polybutyleneterephthalate, polyester, polyacetal, polyamide, polyimide, polycarbonate, polyetheretherketone, polyaryletherketone, polyetherimide, polyamideimide, polybenzimidazole, polyethersulfone, polyphenyleneoxide, a cyclic olefin copolymer, polyphenylenesulfide, and polyethylenenaphthalene. For example, the porous substrate may be a polyolefin (e.g., polyolefin-containing) substrate, and the polyolefin substrate may help improve safety of a battery due to its improved shut-down function. The polyolefin substrate may include, e.g., a polyethylene single film, a polypropylene single film, a polyethylene/polypropylene double film, a polypropylene/polyethylene/polypropylene triple film, or a polyethylene/polypropylene/polyethylene triple film. In an implementation, the polyolefin resin may include a non-olefin resin in addition to an olefin resin or a copolymer of olefin and a non-olefin monomer. The porous substrate may have a thickness of about 1 μm to about 40 μm, e.g., about 5 μm to about 15 μm or about 5 μm to about 10 μm. When the porous substrate has a thickness within the ranges, the porous substrate may have a desirable thickness, e.g., it may be sufficiently thick so that short circuit between a positive electrode and a negative electrode may be prevented while not so thick so that internal resistance of a battery is increased. Air permeability of the porous substrate may be less than or equal to about 250 sec/100 cc, e.g., less than or equal to about 200 sec/100 cc or 150 sec/100 cc. Porosity may be about 30% to about 80%, e.g., about 40% to about 60%.

The porous heat-resistant layer may include a cross-linking binder, a first inorganic particle, and a second inorganic particle. The porous heat-resistant layer may be formed from a porous heat-resistant layer composition.

The porous heat-resistant layer composition according to an example embodiment may include, e.g., a monomer having at least one cross-linkable functional group, an oligomer having at least one cross-linkable functional group, a polymer having at least one cross-linkable functional group, or a mixture thereof; a solvent; an initiator; a first inorganic particle having an average particle diameter ($D_{50}$) X of about 300 nm to about 700 nm; and a second inorganic particle having an average particle diameter ($D_{50}$) of 0.1X to 0.4X (e.g., $\frac{1}{10}$ to $\frac{4}{10}$ of the average particle diameter ($D_{50}$) of the first inorganic particle. In an implementation, a weight ratio of the first inorganic particle to the second inorganic particle (in the composition or layer) may be, e.g., about 7:3 to about 8.5:1.5.

In an implementation, the second inorganic particle may have an average particle diameter ($D_{50}$) of greater than or equal to about 50 nm. Maintaining the average particle diameter of greater than or equal to about 50 nm may help ensure that a moisture content and air permeability are not increased, thereby providing a good porous heat-resistant layer.

In an implementation, the cross-linkable functional group may include, e.g., a (meth)acrylate group, a hydroxy group, a carboxyl group, an ester group, a cyanate group, an isocyanate group, an amino group, a thiol group, a C1 to C10 alkoxy group, a vinyl group, or a heterocyclic group.

The monomer including at least one cross-linkable functional group, oligomer including at least one cross-linkable functional group, polymer including at least one cross-linkable functional group, or a mixture thereof may form a cross-linking (e.g., cross-linked) binder by thermal curing or photo-curing. In an implementation, the cross-linkable functional group may include, e.g., a (meth)acrylate group, a hydroxy group, a carboxyl group, or a vinyl group. In an implementation, the monomer including at least one cross-linkable functional group, oligomer including at least one cross-linkable functional group, or polymer including at least one cross-linkable functional group may include, e.g., a monomer represented by Chemical Formula 1, an oligomer of the monomer represented by Chemical Formula 1, or a polymer of the monomer represented by Chemical Formula 1.

In Chemical Formula 1, $X^1$ to $X^3$ may each be or include, e.g., an oxyethylene group, $X^4$ may be or include, e.g., an oxyethylene group or a C1 to C10 alkyl group, $R^1$ to $R^4$ may each independently be or include, e.g., a (meth)acrylate group, a hydroxy group, a carboxyl group, an ester group, a cyanate group, an isocyanate group, an amino group, a thiol group, a C1 to C10 alkoxy group, a vinyl group, or a heterocyclic group, $a^1$ to $a^4$ may each independently be, e.g., an integer of 1 to 10, and $n^1$ to $n^3$ may each independently be, e.g., an integer of 0 to 10. In an implementation, at least one of $n^1$ to $n^4$ may be an integer of 1 to 10, provided that when $X^4$ is the oxyethylene group, $n^4$ is an integer ranging from 1 to 10 and in is 1, and when $X^4$ is a C1 to C10 alkyl group, $n^4$ is 1 and m is 0.

The ester group may be represented by —COOR, the amino group may be represented by —$NR^aR^b$, in which R, $R^a$, and $R^b$ may each independently be or include a C1 to C20 alkyl group, a C2 to C20 alkenyl group, a C2 to C20 alkynyl group, a C3 to C20 cycloalkyl group, a C3 to C20 cycloalkenyl group, a C4 to C20 cycloalkynyl group, or a C6 to C30 aryl group. In an implementation, the heterocyclic group may be or include, e.g., a C2 to C20 heterocycloalkyl group, a C3 to C20 heterocycloalkenyl group, a C3 to C20 heterocycloalkynyl group, and a C6 to C20 heteroaryl group and may include a heteroatom selected from N, O, and S. In an implementation, the heterocyclic group may be or include, e.g., an epoxy group, an oxetane group, and the like. Examples of the monomer represented by Chemical Formula 1 may include compounds represented by Chemical Formula 2 or Chemical Formula 3.

[Chemical Formula 1]

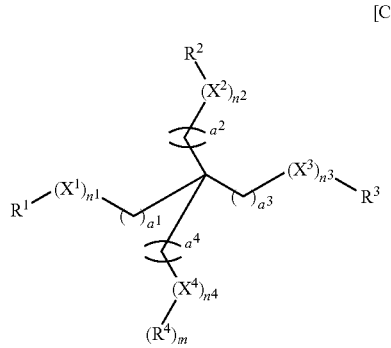

[Chemical Formula 2]

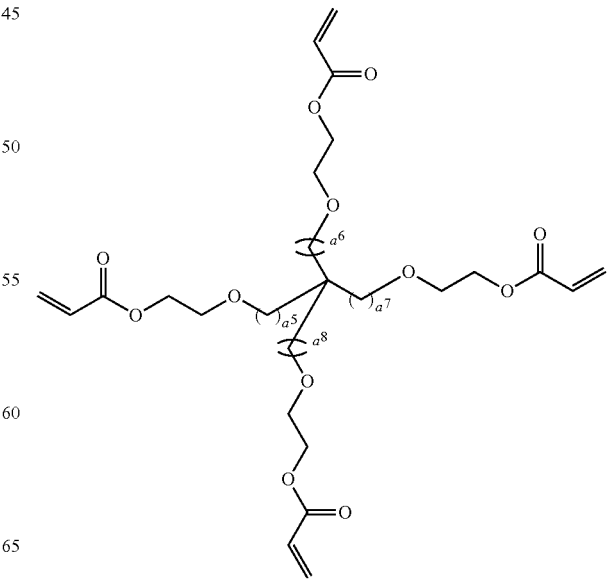

[Chemical Formula 3]

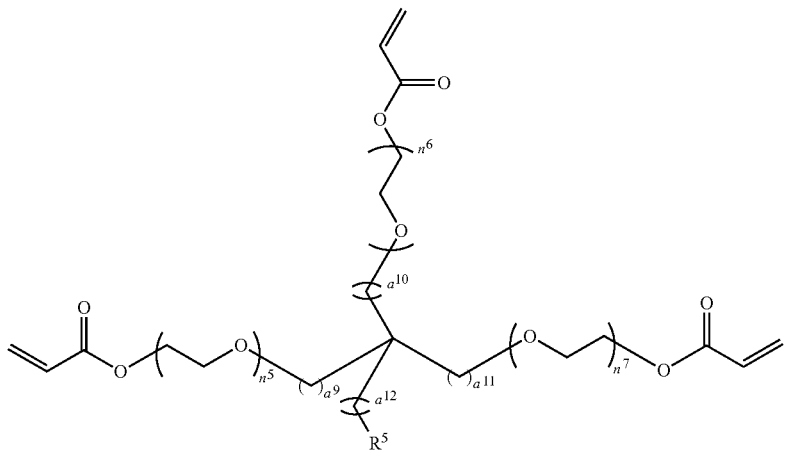

In Chemical Formulae 2 and 3, $R^5$ may be or include, e.g., a C1 to C10 alkyl group, $n^5$ to $n^7$ may each independently be, e.g., an integer of 1 to 5, and $a^5$ to $a^{12}$ may each independently be, e.g., an integer of 1 to 10.

Examples of the compound represented by Chemical Formula 1 may include ethoxylated pentaerythritol tetraacrylate, ethoxylated trimethylolpropane triacrylate, and the like.

The porous heat-resistant layer may include a cross-linking binder that is formed by thermal curing or photo-curing the monomer including at least one cross-linkable functional group, oligomer including at least one cross-linkable functional group, polymer including at least one cross-linkable functional group, or mixture thereof. For example, the porous heat-resistant layer may include a mixture of un-cross-linked monomers, partially cross-linked oligomers, and cross-linked polymers.

The cross-linking binder may help improve dimensional stability of the porous heat-resistant layer and heat resistance of the separator. In addition, impregnation properties of an electrolyte solution due to a cross-linked structure may be improved, and charge and discharge characteristics of a battery may be improved when the separator is used in a battery.

The initiator may initiate a cross-linking reaction of the monomer, oligomer, polymer, or mixture thereof, and thereby enable a cross-linking bond to be formed. The initiator may be appropriately selected depending on a kind of a terminal reactive group of the monomer, oligomer, and/or polymer. For example, the initiator may include a thermal polymerization initiator such as a peroxide initiator, azo initiator, amine initiator, imidazole initiator, or isocyanate initiator, or a photopolymerization initiator such as an onium salt, or an organic metal salt.

Examples of the peroxide initiator may include t-butyl peroxylaurate, 1,1,3,3-t-methylbutylperoxy-2-ethyl hexanonate, 2,5-dimethyl-2,5-di(2-ethylhexanoyl peroxy) hexane, 1-cyclohexyl-1-methylethyl peroxy-2-ethyl hexanonate, 2,5-dimethyl-2,5-di(m-toluoyl peroxy) hexane, t-butyl peroxy isopropyl monocarbonate, t-butyl peroxy-2-ethylhexyl monocarbonate, t-hexyl peroxy benzoate, t-butyl peroxy acetate, dicumyl peroxide, 2,5,-dimethyl-2,5-di(t-butyl peroxy) hexane, t-butyl cumyl peroxide, t-hexyl peroxy neodecanoate, t-hexyl peroxy-2-ethyl hexanonate, t-butyl peroxy-2-2-ethylhexanonate, t-butyl peroxy isobutyrate, 1,1-bis(t-butyl peroxy)cyclohexane, t-hexyl peroxy isopropyl monocarbonate, t-butyl peroxy-3,5,5-trimethyl hexanonate, t-butyl peroxy pivalate, cumyl peroxy neodecanoate, di-isopropyl benzene hydroperoxide, cumene hydroperoxide, isobutyl peroxide, 2,4-dichloro benzoyl peroxide, 3,5,5-trimethyl hexanoyl peroxide, octanoyl peroxide, lauryl peroxide, stearoyl peroxide, succin peroxide, benzoyl peroxide, 3,5,5-trimethyl hexanoyl peroxide, benzoyl peroxy toluene, 1,1,3,3-tetramethyl butyl peroxy neodecanoate, 1-cyclohexyl-1-methyl ethyl peroxy neodecanoate, di-n-propyl peroxy dicarbonate, di-isopropyl peroxy carbonate, bis (4-t-butyl cyclohexyl) peroxy dicarbonate, di-2-ethoxy methoxy peroxy dicarbonate, di(2-ethyl hexyl peroxy) dicarbonate, dimethoxy butyl peroxy dicarbonate, di(3-methyl-3-methoxy butyl peroxy) dicarbonate, 1,1-bis(t-hexyl peroxy)-3,3,5-trimethyl cyclohexane, 1,1-bis(t-hexyl peroxy) cyclohexane, 1,1-bis(t-butyl peroxy)-3,3,5-trimethyl cyclohexane, 1,1-(t-butyl peroxy) cyclododecane, 2,2-bis(t-butyl peroxy)decane, t-butyl trimethyl silyl peroxide, bis(t-butyl) dimethyl silyl peroxide, t-butyl triallyl silyl peroxide, bis(t-butyl) diallyl silyl peroxide, tris(t-butyl) aryl silyl peroxide, and the like. Examples of the azo initiator may include 2,2'-azobis (4-methoxy-2,4-dimethyl valeronitrile), dimethyl 2,2'-azobis(2-methyl propionate), 2,2'-azobis(N-cyclohexyl-2-methyl propionate), 2,2-azobis(2,4-dimethyl valeronitrile), 2,2'-azobis(2-methyl butyronitrile), 2,2'-azobis[N-(2-propenyl)-2-methylpropionate], 2,2'-azobis(N-butyl-2-methyl propionate), 2,2'-azobis[N-(2-propenyl)-2-methyl propionate], 1,1'-azobis(cyclohexane-1-carbonitrile), 1-[(cyano-1-methylethyl)azo] formamide, and the like. Examples of the isocyanate initiator may include a polyisocyanate-based initiator, and may be aliphatic polyisocyanate, alicyclic polyisocyanate, directionaliphatic polyisocyanate, aromatic polyisocyanate, a derivative thereof or a modified product thereof, and the like. For example, trimethylenediisocyanate, tetramethylene diisocyanate, hexamethylenediisocyanate, pentamethylenediisocyanate, 1,2-propylenediisocyanate, 1,2-butylenediisocyanate, 2,3-butylenediisocyanate, 1,3-butylenediisocyanate, 2,4,4- or 2,2,4-trimethylhexamethylenediisocyanate, 2,6-diisocyanatemethylcaproate, lysine ester triisocyate, 1,4,8-triisocyanateoctane, 1,6,11-triisocyanateundecane, 1,8-diisocyanate-4-isocyanatemethyloctane, 1,3,6-triisocyanatehexane, 2,5,7-trimethyl-1,8-diisocyanate-5-isocyanatemethyloctane, and the like. Other thermal polymerization initiators may include benzophenone (BZP, Manufacturer: Aldrich), 2,6-bis(azidobenzylidene)-4-methylcyclohexanone (bisazido, Manufacturer: Aldrich), 2,2-dimethoxy-2-phenylacetophenone, 1-benzoyl-1-hydroxycyclohexane, 2,4,6-trimethylbenzoyldiphenylphosphine oxide, 3-methyl-2-butenyltetramethylenesulfonium a hexafluoroantimonate salt, a ytterbium trifluoromethane sulfonate salt, a samarium trifluoromethane sulfonate salt, an erbium trifluoromethane sulfonate salt, a dysprosium trifluoromethane sulfonate salt, a lanthanum trifluoromethane sulfonate salt, a tetrabutylphosphonium methane sulfonate salt, an ethyltriphenylphosphonium bromide slat, benzyldimethylamine, dimethylaminomethyl phenol, triethanolamine, 2-methylimidazole, 2-ethyl-4-methylimidazole, 1,8-diaza-bicyclo (5,4,0)undecene-7, triethylenediamine, and tri-2,4-6-dimethylaminomethylphenol, and the like.

Examples of the photopolymerization initiator may include an aryl sulfonium hexafluoroantimonate salt, a diphenyldiiodonium hexafluorophosphate salt, diphenyl iodonium hexaantimonium salt, a ditolyliodonium hexafluorophosphate salt, a 9-(4-hydroxyethoxyphenyl)dianthrenium hexafluorophosphate salt, and the like.

The initiator may be used in an amount of about 1 wt % to about 15 wt %, e.g., about 3 wt % to about 10 wt %, based on a weight of the monomer including at least one cross-linkable functional group, oligomer including at least one cross-linkable functional group, polymer including at least one cross-linkable functional group, or a mixture thereof. Within the ranges, a desirable cross-linking degree or curing degree may be obtained.

In an implementation, a cross-linking agent may be further added in order to help control a cross-linking degree. Examples of the cross-linking agent may include m- or p-divinylbenzene, ethylene glycol dimethacrylate such as 1,4-cyclohexanediol bismethacrylate.

The solvent may include a suitable solvent that may dissolve the monomer including at least one cross-linkable functional group, the oligomer including at least one cross-linkable functional group, and/or the polymer including at least one cross-linkable functional group, and/or may dissolve or disperse the cross-linking binder. Examples of such a solvent may include hydrocarbon solvents such as C1 to C15 alcohols, aliphatic hydrocarbons, alicyclic hydrocarbons, aromatic hydrocarbons, and the like, halogenated hydrocarbon solvents, ethers such as aliphatic ethers, alicyclic ethers, and the like, or mixtures thereof. For example, the solvent may include ketones such as acetone, methylethylketone, methylbutylketone, methylisobutylketone, cyclohexanone, and the like, ethers such as ethylether, dioxane, tetrahydrobutane, and the like, esters such as methyl acetate, ethyl acetate, propyl acetate, isopropyl acetate, butyl acetate, isobutyl acetate, pentyl acetate, isopentyl acetate, and the like, alcohols such as butanol, 2-butanol, isobutanol, isopropylalcohol, ethanol, methanol, and the like, halogenated hydrocarbons such as dichloromethane, chloroform, dichloroethane, trichloroethane, tetrachloroethane, dichloroethylene, trichloroethylene, tetrachloroethylene, chlorobenzene, and the like, hydrocarbons such as n-hexane, cyclohexanol, methylcyclohexanol, benzene, toluene, and the like.

The first inorganic particle and the second inorganic particle may be suitable particles having an average particle diameter ($D_{50}$) as described herein. In an implementation, the inorganic particles may include, e.g., $Al_2O_3$, $SiO_2$, $B_2O_3$, $Ga_2O_3$, $TiO_2$, $MgOH_2$, boehmite (for example AlOOH), or $SnO_2$. These may be used alone or as a mixture of two or more.

In an implementation, the first and second inorganic particles may include, e.g., $Al_2O_3$ (alumina) or boehmite. A size (X) of the first inorganic particle used in an embodiment may be an average particle diameter ($D_{50}$) of about 300 nm to about 700 nm, e.g., about 400 nm to about 600 nm or about 500 nm. A size of the second inorganic particle used in an embodiment may be related to the size (X) of the first inorganic particle, e.g., an average particle diameter ($D_{50}$) of about 0.1X to about 0.4X. When the second inorganic particle has a size of greater than or equal to about $\frac{1}{10}$ of that of the first inorganic particle, sufficient air permeability characteristics may be obtained. When the second inorganic particle has a size of less than or equal to about $\frac{4}{10}$ of that of the first inorganic particle, a small thermal shrinkage ratio, sufficient rupture/heat resistance characteristics, and relatively high elastic modulus and hardness may be obtained. In an implementation, the second inorganic particle may have an average particle diameter of greater than or equal to about 50 nm. Maintaining the average particle diameter of the second inorganic particle at greater than or equal to about 50 nm may help prevent a moisture increase or an air permeability increase.

When the first and second inorganic particles have a size within the range, deterioration of dispersibility and processibility of the inorganic particles in a porous heat-resistant layer composition may be prevented, and deterioration of mechanical properties and an increase of electrical resistance may also be prevented due to an appropriately-adjusted thickness of a heat-resistant layer. In an implementation, when the first and second inorganic particles having a different average particle diameter are mixed, a number of contact point among the inorganic particles may be increased. Thus an elastic modulus and hardness may increase, a thermal shrinkage ratio may decrease, and rupture/heat resistance characteristics may be much improved.

For example, when a weight ratio of the first inorganic particle and the second inorganic particle is about 7:3 to about 8.5:1.5, a thermal shrinkage ratio and rupture heat resistance characteristics may be further improved. Accordingly, a separator having a porous heat-resistant layer (having the first and second inorganic particles) on one surface or both surfaces may maintain a shape and thus may help prevent a short circuit even when a temperature is sharply increased.

The first and second inorganic particles may be included together in a sum or total amount of about 50 wt % to about 95 wt %, e.g., about 60 wt % to about 95 wt %, about 75 wt % to about 95 wt %, or about 80 wt % to about 92 wt %, based on the entire solid weight of the porous heat-resistant layer (or the porous heat-resistant layer composition). When the first and second inorganic particles are used within the range, thermal radiation properties of the inorganic particles may be sufficiently exerted and thus when a separator is coated with the inorganic particles, thermal shrinkage of the separator may be effectively suppressed.

The composition for a porous heat-resistant layer may be prepared as an inorganic dispersion liquid by independently dispersing the first and second inorganic particles in appropriate or suitable solvents. In an implementation, the solvent for dispersing the first inorganic particle may include, e.g., acetone, and the solvent for dispersing the second inorganic particle may include, e.g., methylethylketone. The inorganic dispersion liquid may be prepared, e.g., in a method of adding an appropriate amount of $Al_2O_3$ to acetone or methylethylketone and then, dispersing the mixture with a bead mill.

In an implementation, the separator according to an embodiment may further include a non-cross-linking binder. The separator may include a porous heat-resistant layer formed from a porous heat-resistant layer composition including a monomer including at least one cross-linkable functional group, an oligomer including at least one cross-linkable functional group, a polymer including at least one cross-linkable functional group, or a mixture thereof; a non-cross-linking binder; a solvent; an initiator; a first inorganic particle having an average particle diameter ($D_{50}$) X of about 300 nm to about 700 nm; and a second inorganic particle having an average particle diameter ($D_{50}$) of 0.1X to 0.4X. The non-cross-linking binder may be additionally included and thus may help improve adherence the porous heat-resistant layer to a substrate and an electrode and also may contribute to forming a pore and thus improve air permeability. The separator according to the present example embodiment may include substantially the same constituent elements as those of a separator according to an example embodiment of the present disclosure except for the non-cross-linking binder, and thus the non-cross-linking binder is mainly illustrated.

Examples of the non-cross-linking binder may include a polyvinylidene fluoride (PVdF) (e.g., PVdF-containing) polymer, polymethylmethacrylate, polyacrylonitrile, polyvinylpyrrolidone, polyvinylacetate, polyethyleneoxide, cellulose acetate, cellulose acetate butyrate, cellulose acetate propionate, cyanoethylpullulan, cyanoethylpolyvinyl alcohol, cyanoethyl cellulose, cyanoethylsucrose, pullulan, carboxyl methyl cellulose, an acrylonitrile-butadiene-styrene polymer, or a mixture thereof.

For example, the non-cross-linking binder may include a PVdF polymer. In an implementation, the non-cross-linking binder may include, e.g., a PVdF homopolymer, a PVdF copolymer, or a mixture thereof. The PVdF homopolymer indicates a polymer including a PVdF-derived unit, and the PVdF copolymer indicates a polymer including the PVdF-derived unit and at least one unit derived from other monomers. In an implementation, the polymer may include the PVdF-derived unit and at least one unit derived from chlorotrifluoroethylene (CTFE), trifluoroethylene (TFE), hexafluoropropylene (HFP), ethylene tetrafluoride, or ethylene, e.g., a PVdF-HFP-based copolymer including the PVdF-derived unit and a HFP-derived unit may be used. In the PVdF-HFP-based copolymer, the HFP-derived unit may be included in an amount of about 1 to about 20 parts by weight, e.g., about 5 to about 15 parts by weight, based on the entire weight of the PVdF-HFP-based copolymer.

A weight ratio of the monomer, oligomer, polymer, or the mixture thereof to the non-cross-linking binder may be about 2:8 to about 6:4, e.g., about 2:8 to about 5:5 or about 4:6 to about 5:5. Within the weight ratio ranges, both heat resistance and adherence may be desirably satisfied.

According to another example embodiment, a separator may include a porous substrate; and a porous heat-resistant layer disposed on one surface or both surfaces of the porous substrate. The porous heat-resistant layer may include a cross-linking binder; a non-cross-linking binder; a first inorganic particle having an average particle diameter ($D_{50}$) X of about 300 nm to about 700 nm; and a second inorganic particle having an average particle diameter ($D_{50}$) of 0.1X to 0.4X. In the separator, a thermal shrinkage ratio may be less than or equal to about 10% after being exposed for about 1 hour at about 150° C., rupture may not occur after being allowed to stand for about 10 minutes at about 230° C., an elastic modulus may be greater than or equal to about 500 MPa and less than or equal to about 700 MPa, and/or a hardness may be greater than or equal to about 25 N/mm$^2$ and less than or equal to about 35 N/mm$^2$.

The thermal shrinkage ratio may be a parameter indicating a shrinkage degree of a separator at a high temperature and may be obtained by cutting the separator into a size of 13 cm×13 cm, marking two points in a distance of about 10 cm in each MD and TD direction and one point where the MD and TD directions are vertically crossed to prepare a sample, and then, putting the sample in a 150° C. oven (LO-FS050, LK Lab Korea Co., Ltd.) and allowing it to stand for one hour. The thermal shrinkage ratio may be calculated according to Equation 1.

$$\text{Thermal shrinkage ratio } (\%) = (A-B)/A \times 100 \qquad \text{Equation 1}$$

Herein, A indicates a length before putting a separator in an oven, and B is a length after allowing the separator to stand in the oven for 1 hour.

The rupture/heat resistance may be a parameter showing a degree to which a fixed separator is not contracted but resistant against a rupture at a high temperature and may be evaluated by cutting the separator into a size of 6 cm×6 cm in the MD and TD directions, fixing the cut separator on a metal frame having a hole of 5 cm×5 cm in the center with a polyimide film, putting it in an oven (LO-FS050, LK Lab Korea Co., Ltd.), allowing it to stand at about 200° C. to about 250° C. for 10 minutes, and then, giving 'fail' or 'NG' when a rupture is found and 'pass' or 'OK' when no rupture is found. The separator may be fixed between positive and negative electrodes in a battery, and the fixed separator may be used to evaluate rupture/heat resistance as an indicator for judging heat resistance of the separator.

The elastic modulus and the hardness may be used to evaluate mechanical characteristics of the separator from load/indentation depth results continuously measured with a microindentation equipment (FISCHERSCOPE HM2000 Microindenter) while the separator is indented by an indenter. The elastic modulus, hardness, and the like are related to reinforcement of the mechanical characteristics of the separator and thus reduce a short circuit of a jelly-roll due to an external impact inside a battery.

Hereinafter, a method of manufacturing a separator according to example embodiments of the present disclosure is described. A method of manufacturing the separator may include preparing a porous heat-resistant layer composition that includes a monomer including at least one cross-linkable functional group, an oligomer including at least one cross-linkable functional group, a polymer including at least one cross-linkable functional group, or a mixture thereof; a non-cross-linking binder; an initiator; a solvent; a first inorganic particle having an average particle diameter ($D_{50}$) X of about 300 nm to about 700 nm; and a second inorganic particle having an average particle diameter ($D_{50}$) of 0.1X to 0.4X. A weight ratio of the first inorganic particle and the second inorganic particle may be about 7:3 to about 8.5:1.5. The method may further include coating the porous heat-resistant layer composition on one surface or both surfaces of a porous substrate, and curing the coated porous heat-resistant layer composition to form a porous heat-resistant layer.

The porous heat-resistant layer composition may be manufactured by mixing the monomer, oligomer, polymer, or mixture thereof; the non-cross-linking binder; the initiator; the solvent; the first inorganic particle; and the second inorganic particle and stirring the mixture at about 10° C. to about 40° C. for about 30 minutes to about 5 hours. The mixing may be performed by using a ball mill, a bead mill, a screw mixer, or the like.

The non-cross-linking binder may be dispersed or dissolved in advance in a solvent capable of dispersing or dissolving it and then, mixing it with the monomer, oligomer, polymer, or mixture thereof to prepare a binder solution. In an implementation, the binder solution may include the non-cross-linking binder may be prepared without the non-cross-linking binder. In an implementation, the first and second inorganic particles may be respectively added to suitable solvents to respectively prepare first and second inorganic dispersion liquids, and then, these inorganic dispersion liquids and the binder solution may be mixed with a solvent such as acetone and the like to prepare a composition for a porous heat-resistant layer.

Subsequently, the composition for a porous heat-resistant layer may be used to form a porous heat-resistant layer on one surface or both surfaces of a porous substrate. Before forming the porous heat-resistant layer, the porous substrate may be pre-treated on one surface or both surfaces, e.g., sulfonated, grafted, corona discharged, radiated by ultraviolet rays, plasma-treated, or sputter-etched, and the like to help improve close contacting properties with the porous heat-resistant layer. Through the pre-treatment, the porous heat-resistant layer may have, e.g., an island shape or a thin film shape.

A method of forming the porous heat-resistant layer on the porous substrate by using the composition for a porous heat-resistant layer may include a suitable method, e.g., coating, lamination, coextrusion, or the like. Examples of the coating may include dip coating, die coating, roll coating, comma coating, and the like. These methods may be used alone or as a combination of more than two. For example, a porous heat-resistant layer of a separator according to the present disclosure may be formed in the dip coating method.

Then, the porous heat-resistant layer may be dried. The drying may evaporate a solvent used to form the porous heat-resistant layer composition. The drying may minimize the solvent remaining in the porous heat-resistant layer composition by controlling a drying temperature and a drying time. The drying temperature may be, e.g., about 80° C. to about 120° C. or about 80° C. to about 100° C., and the drying time may be about 5 seconds to about 60 seconds, e.g., about 10 seconds to about 40 seconds.

Subsequently, the porous heat-resistant layer may be photocured or thermally cured. The photocuring may be performed by using ultraviolet rays or far-infrared rays, e.g., ultraviolet rays. The photocuring may include, e.g., radiation of a light amount of about 500 mJ/cm$^2$ to about 3000 mJ/cm$^2$ or about 500 mJ/cm$^2$ to about 2000 mJ/cm$^2$ on one surface of a porous substrate into the porous heat-resistant layer. The radiation may be performed for about 1 minute to about 15 hours. After the photocuring, a subsequent heat treatment may be performed at greater than or equal to about 50° C. and less than or equal to about 180° C. for about 1 hour to about 10 hours to obtain homogeneous curing density. In an implementation, the thermal curing may be performed at about 60° C. to about 120° C. for about 1 hour to about 50 hours, e.g., at about 80° C. to about 110° C. for about 5 hours to about 30 hours. Through the curing, the monomer including at least one cross-linkable functional group, oligomer including at least one cross-linkable functional group, polymer including at least one cross-linkable functional group, or a mixture thereof may be linked to one another to form a cross-linking type binder.

The porous heat-resistant layer may be about 1 μm to about 15 μm thick in total, e.g., about 1 μm to about 10 μm thick or about 1 μm to about 6 μm thick. When the porous heat-resistant layer has a thickness within the range, the porous heat-resistant layer may obtain excellent thermal stability and adherence due to the appropriate thickness and may help prevent extremely thickening of the separator and suppress an internal resistance increase of a battery.

According to an example embodiment, an electrochemical battery may include a positive electrode; a negative electrode; the separator disposed between the positive electrode and the negative electrode; and an electrolyte. The electrochemical battery may be a suitable type of battery.

The electrochemical battery may be, e.g., a rechargeable lithium battery such as a lithium metal rechargeable battery, a lithium ion secondary battery, a lithium polymer rechargeable battery, or a lithium ion polymer rechargeable battery.

A method of manufacturing the electrochemical battery, e.g., a rechargeable lithium battery may include a suitable method. Examples of the method of manufacturing a rechargeable lithium battery may be as follows: interposing a separator including the heat-resistant layer of the present disclosure between positive and negative electrodes of a battery and injecting an electrolyte solution thereinto.

The FIGURE illustrates an exploded perspective view showing an electro-chemical battery according to an embodiment. A prismatic rechargeable lithium battery is illustrated as an example of an electrochemical battery according to an embodiment. In an implementation, the present disclosure may be applied to various batteries such as a lithium polymer battery and a cylindrical battery.

Referring to the FIGURE, a rechargeable lithium battery 100 according to an embodiment may include an electrode assembly 40 manufactured by disposing a separator 30 interposed between a positive electrode 10 and a negative electrode 20 and winding them, and a case 50 housing the electrode assembly 40. The positive electrode 10, the negative electrode 20 and the separator 30 may be impregnated with an electrolyte solution.

The separator 30 may be the same as described above.

The positive electrode 10 may include a positive current collector and a positive active material layer formed on the positive current collector. The positive active material layer may include a positive active material, a binder, and optionally a conductive material.

The positive current collector may include, e.g., aluminum (Al), nickel (Ni), or the like.

The positive active material may use a compound being capable of intercalating and deintercallating lithium. In an implementation, at least one of a composite oxide or a composite phosphate of a metal selected from cobalt, manganese, nickel, aluminum, iron, or a combination thereof and lithium may be used. For example, the positive active material may use lithium cobalt oxide, lithium nickel oxide, lithium manganese oxide, lithium nickel cobalt manganese oxide, lithium nickel cobalt aluminum oxide, lithium iron phosphate, or a combination thereof.

The binder may help improve binding properties of positive active material particles with one another and with a current collector. Examples may include polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like. These may be used singularly or as a mixture of two or more.

The conductive material may help improve conductivity of an electrode. Examples thereof may include natural graphite, artificial graphite, carbon black, a carbon fiber, a metal powder, a metal fiber, and the like. These may be used singularly or as a mixture of two or more. The metal powder and the metal fiber may use a metal of copper, nickel, aluminum, silver, and the like.

The negative electrode 20 may include a negative current collector and a negative active material layer formed on the negative current collector.

The negative current collector may include, e.g., copper (Cu), gold (Au), nickel (Ni), a copper alloy, or the like.

The negative active material layer may include a negative active material, a binder and optionally a conductive material.

The negative active material may include a material that reversibly intercalates/deintercalates lithium ions, a lithium metal, a lithium metal alloy, a material being capable of doping and dedoping lithium, a transition metal oxide, or a combination thereof.

The material that reversibly intercalates/deintercalates lithium ions may include a suitable carbon material for a carbon-based negative active material, and examples thereof may include crystalline carbon, amorphous carbon, or a combination thereof. Examples of the crystalline carbon may include graphite such as amorphous, sheet-shape, flake, spherical shape or fiber-shaped natural graphite or artificial graphite. Examples of the amorphous carbon may include soft carbon or hard carbon, a mesophase pitch carbonized product, fired coke, and the like. The lithium metal alloy may include an alloy of lithium and a metal selected from Na, K, Rb, Cs, Fr, Be, Mg, Ca, Sr, Si, Sb, Pb, In, Zn, Ba, Ra, Ge, Al, and Sn. The material capable of doping and dedoping lithium may be Si, $SiO_x$ (0<x<2), a Si—C composite, a Si—Y' alloy, Sn, $SnO_2$, a Sn—C composite, a Sn—Y' alloy, and the like, and at least one of these may be mixed with $SiO_2$. Examples of the element Y' may include Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof. The transition metal oxide may include vanadium oxide, lithium vanadium oxide, or the like.

The binder and the conductive material used in the negative electrode may be the same as the binder and conductive material of the positive electrode.

The positive electrode and the negative electrode may be manufactured by mixing each active material composition including each active material and a binder, and optionally a conductive material in a solvent, and coating the active material composition on each current collector. In an implementation, the solvent may include N-methyl pyrrolidone or the like.

The electrolyte solution may include an organic solvent and a lithium salt.

The organic solvent serves as a medium for transmitting ions taking part in the electrochemical reaction of a battery. Examples thereof may include a carbonate solvent, an ester solvent, an ether solvent, a ketone solvent, an alcohol solvent, or an aprotic solvent.

Examples of the carbonate solvent may include dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), and the like. For example, when the linear carbonate compounds and cyclic carbonate compounds are mixed, an organic solvent having a high dielectric constant and a low viscosity may be provided. The cyclic carbonate compound and the linear carbonate compound are mixed together in a volume ratio ranging from about 1:1 to about 1:9.

Examples of the ester solvent may include methylacetate, ethylacetate, n-propylacetate, dimethylacetate, methylpropionate, ethylpropionate, γ-butyrolactone, decanolide, valerolactone, mevalonolactone, caprolactone, and the like. Examples of the ether solvent may include dibutylether, tetraglyme, diglyme, dimethoxyethane, 2-methyltetrahydrofuran, tetrahydrofuran, and the like. Examples of the ketone solvent may include cyclohexanone and the like, and examples of the alcohol solvent may include ethanol, isopropyl alcohol, and the like.

The organic solvent may be used singularly or in a mixture of two or more, and when the organic solvent is used in a mixture of two or more, the mixture ratio may be controlled in accordance with a desirable cell performance.

The lithium salt is dissolved in an organic solvent, supplies lithium ions in a battery, basically operates the rechargeable battery, and improves lithium ion transportation between positive and negative electrodes therein.

Examples of the lithium salt may be $LiPF_6$, $LiBF_4$, $LiSbF_6$, $LiAsF_6$, $LiN(SO_3C_2F_5)_2$, $LiN(CF_3SO_2)_2$, $LiC_4F_9SO_3$, $LiClO_4$, $LiAlO_2$, $LiAlCl_4$, $LiN(CXF_2X_{+1}SO_2)$ $(C_yF_{2y+1}SO_2)$, x and y are natural numbers, LiCl, LiI, $LiB(C_2O_4)_2$, or a combination thereof.

The lithium salt may be used in a concentration ranging from about 0.1 M to about 2.0 M. When the lithium salt is included within the above concentration range, an electrolyte may have excellent performance and lithium ion mobility due to optimal electrolyte conductivity and viscosity.

Hereinafter, Examples, Comparative Examples, and Experimental Examples are illustrated to explain the present disclosure in more detail.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Example 1: Manufacture of Separator

A first alumina dispersion liquid was prepared by adding 25 wt % of first alumina particles having an average particle diameter ($D_{50}$) of 500 nm (AES011, Sumitomo Chemical Co., Ltd.) to acetone (Daejung Chemicals & Metals Co., Ltd.) and dispersing the mixture with a bead mill at 25° C. for 3 hours. In addition, a second alumina dispersion liquid was prepared by adding 30 wt % of second alumina particles having an average particle diameter ($D_{50}$) of 200 nm (AKP53, Sumitomo Chemical Co., Ltd.) to methylethylketone and dispersing the mixture at 25° C. for 3 hours with a bead mill. Then, the first alumina dispersion liquid was added to the second alumina dispersion liquid to have a weight ratio of 8.5:1.5 of the first alumina particles to the second alumina particles to prepare an inorganic particle dispersion liquid.

A non-cross-linking binder solution was prepared by dissolving 7 wt % of a PVdF polymer (Mw: 1,200,000 g/mol, KF9300, Kureha Chemical Industries) in a mixed solvent (68 wt % of acetone and 25 wt % of DMAc), and ethoxylated pentaerythritol tetraacrylate (PE-044, Hannong Chemicals Inc.) was added thereto to have a weight ratio of 4:6 of PVdF polymer to ethoxylated pentaerythritol tetraacrylate to obtain a binder solution.

The binder solution was mixed with the alumina dispersion liquid to have a weight ratio of 1:9.6 of a binder solid to an alumina solid, 5 wt % of lauroyl peroxide (Daejung Chemicals & Metals Co., Ltd.) based on a weight of the PE-044 was added thereto, and acetone was added thereto to have an entire solid of 17.2 wt % to manufacture a porous heat-resistant layer composition.

The composition was dip-coated to be 3 μm thick on the cross section of a 12 μm thick polyethylene fabric panel (air permeability: 120 sec/100 cc, SK). Subsequently, the obtained film was dried at 100° C. for 0.5 minutes to manufacture a separator. The separator was cured in an 85° C. oven for 10 hours to have a total thickness of 15 μm.

Example 2: Manufacture of Separator

A separator was manufactured according to the same method as Example 1 except for using the first alumina particles and the second alumina particles in a weight ratio of 8:2.

Example 3: Manufacture of Separator

A separator was manufactured according to the same method as Example 1 except for using the first alumina particles and the second alumina particles in a weight ratio of 7:3.

Comparative Example 1: Manufacture of Separator

A separator was manufactured according to the same method as Example 1 except for using the first alumina particles and the second alumina particles in a weight ratio of 9:1.

Comparative Example 2: Manufacture of Separator

A separator was manufactured according to the same method as Example 1 except for using the first alumina particles and the second alumina particles in a weight ratio of 10:0 (i.e., the second alumina particles were omitted).

Comparative Example 3: Manufacture of Separator

A separator was manufactured according to the same method as Example 1 except for using the first alumina particles and the second alumina particles in a weight ratio of 6:4.

Comparative Example 4: Manufacture of Separator

A separator was manufactured according to the same method as Example 1 except for changing the average particle diameter of the first alumina particles to 700 nm and the average particle diameter of the second alumina particles to 50 nm and using the first alumina particles and the second alumina particles in a weight ratio of 7:3.

Comparative Example 5: Manufacture of Separator

A separator was manufactured according to the same method as Example 1 except for and changing the average particle diameter of the first alumina particles to 700 nm and the average particle diameter of the second alumina particles to 500 nm and using the first alumina particles and the second alumina particles in a weight ratio of 7:3.

Experimental Example

A thermal shrinkage ratio, rupture/heat resistance, an elastic modulus, hardness, and air permeability of the separators according to Examples 1 to 3 and Comparative Examples 1 to 5 were measured, and the results are shown in Table 1.

Thermal Shrinkage Ratio

Each separator according to Examples 1 to 3 and Comparative Examples 1 to 5 was cut into a size of 13 cm×13 cm, marking two points in MD and TD directions every 10 cm and a point where the MD and TD directions vertically crossed each other to prepare samples, these samples were put in a 150° C. oven (LO-FS050, LK Lab Korea Co., Ltd.) and allowed to stand for one hour, and a distance between two points in the MD and TD directions was measured. Thermal shrinkage ratios of the samples were calculated according to Equation.

$$\text{Thermal shrinkage ratio } (\%) = (A-B)/A \times 100 \quad \text{Equation 1}$$

Herein, A indicates a length before putting a sample in the oven, and B indicates a length after allowing the sample to stand in the oven for one hour.

Rupture/Heat Resistance

The separators according to Examples 1 to 3 and Comparative Examples 1 to 5 were respectively cut into a size of 6 cm×6 cm in MD and TD directions. The separators were respectively fixed on a metal frame having a hole of 5 cm×5 cm in the center with a polyimide film and positioned in an oven (LO-FS050, LK Lab Korea Co., Ltd.) at 230° C., 240° C., and 250° C. for 10 minutes, and then, when there was a rupture, the separator was evaluated as 'NG,' and when where was no rupture, the separator was evaluated as 'OK.'

Elastic Modulus and Hardness

Each of the separators according to Examples 1 to 3 and Comparative Examples 1 to 5 was cut into a size of 10 cm×5 cm, and its mechanical characteristics were evaluated by measuring its elastic modulus and hardness with a micro-indentation equipment (Fischerscope HM2000 Microindenter) from the load/indentation depth results continuously measured, while an indenter was indented into each separator (a load: 10 mN, a load rate: 1 sec/mN).

Air Permeability

The separators according to Examples 1 to 3 and Comparative Examples 1 to 5 were respectively cut into a size of holding a circle with a diameter of 1 inch from ten different places to obtain ten samples, and air permeability of each separator was measured by measuring how long air of 100 cc passes the ten samples with an air permeability-measuring device (Asahi Seiko Co., Ltd.). The time was respectively five times measured and then, averaged to obtain the air permeability.

TABLE 1

|  | Ex. 1 | Ex. 2 | Ex. 3 | Comp. Ex. 1 | Comp. Ex. 2 | Comp. Ex. 3 | Comp. Ex. 4 | Comp. Ex. 5 |
|---|---|---|---|---|---|---|---|---|
| First particle $D_{50}$ (A) (nm) | 500 | 500 | 500 | 500 | 500 | 500 | 700 | 700 |
| Second particle $D_{50}$ (B) (nm) | 200 | 200 | 200 | 200 | 200 | 200 | 50 | 500 |
| A:B weight | 8.5/1.5 | 8/2 | 7/3 | 9/1 | 10/0 | 6/4 | 7/3 | 7/3 |

TABLE 1-continued

|  | Ex. 1 | Ex. 2 | Ex. 3 | Comp. Ex. 1 | Comp. Ex. 2 | Comp. Ex. 3 | Comp. Ex. 4 | Comp. Ex. 5 |
|---|---|---|---|---|---|---|---|---|
| Thermal shrinkage ratio MD/TD (%) | 7/8 | 3/3 | 2/1 | 14/17 | 17/23 | 1/1 | 1/1 | 20/22 |
| Rupture/heat resistance | | | | | | | | |
| 230° C. | OK | OK | OK | OK | OK | OK | OK | NG |
| 240° C. | OK | OK | OK | NG | NG | OK | OK | NG |
| 250° C. | OK | OK | OK | NG | NG | OK | OK | NG |
| Elastic modulus (MPa) | 650 | 700 | 720 | 330 | 300 | 740 | 800 | 250 |
| Hardness (N/mm$^2$) | 32 | 35 | 37 | 25 | 20 | 40 | 40 | 18 |
| Air permeability (sec/100 cc) | 185 | 187 | 195 | 182 | 180 | 220 | 280 | 170 |

Referring to Table 1, Examples 1 to 3 (using the first and second inorganic particles in a weight ratio of 7:3 to 8.5:1.5) showed a thermal shrinkage ratio of less than or equal to 10%, no rupture at a high temperature of greater than or equal to 230° C., e.g., greater than or equal to 250° C., and a relatively large elastic modulus of greater than or equal to 650 Mpa and high hardness of greater than or equal to 30 and thus excellent stability. Comparative Examples 1 and 2 (using first and second inorganic particles having the same size as Examples 1 to 3 but the second inorganic particle in a relatively small amount or not at all) showed a high thermal shrinkage ratio of greater than or equal to 10% and a rupture at a high temperature of greater than or equal to 240° C. In addition, Comparative Examples 1 and 2 (using the second inorganic particle in a small amount or not at all) showed relatively small elastic modulus and hardness. Comparative Example 3 (using the second inorganic particle in an excessive) amount showed a thermal shrinkage ratio of less than or equal to 10% and considerably large elastic modulus and hardness, but much increased air permeability and resultantly disadvantageous battery characteristics.

In addition, Comparative Example 4 (using the second inorganic particle having a size smaller than 1/10 of that of the first inorganic particle) showed excellent stability but much increased air permeability and thus disadvantageous battery characteristics. Furthermore, Comparative Example 5 (using the second inorganic particle having a size larger than 4/10 of the first inorganic particle) showed a high thermal shrinkage ratio and a rupture at greater than or equal to 230° C. and thus considerably small elastic modulus and hardness.

By way of summation and review, a separator may be fused at a particular temperature and may block an opening and thus perform a shut down function of stopping a battery reaction and suppressing exothermicity. A large-sized rechargeable battery may radiate relatively less heat than a small-sized rechargeable battery and thus may become highly exothermic during a short circuit or the like, and an internal battery temperature may be increased up to greater than or equal to about 200° C. and even about 400 to about 500° C. within a couple of seconds. A separator formed of the thermally fusible resin may not only block an opening during the fusion but may also even be fused itself and may just melt down. The melt-down may result in electrodes contacting one another, and a short circuit current may flow therein again and thus may keep an exothermic state and leads to a thermal explosion. Accordingly, a separator may have no rupture, and may maintain a shape and having a small thermal shrinkage ratio under an environment where an internal temperature in the large-sized rechargeable battery is increased to a high temperature of greater than or equal to about 200° C. within a couple of seconds may be provided.

The embodiments may provide a separator and an electrochemical battery using the same that is not ruptured at an environment where a temperature inside a battery is increased in several seconds up to about 200° C. and may maintain a shape due to a small thermal shrinkage ratio.

The embodiments may provide a separator that has a thermal shrinkage ratio is less than or equal to about 10% when being exposed for about 1 hour at about 150° C. and is not ruptured when being allowed to stand for about 10 minutes at about 230° C.

The separator according to an example embodiment may have a small thermal shrinkage ratio and excellent heat/rupture characteristics and thus no rupture, but rather maintains a shape even under an environment where an internal temperature in a large-sized rechargeable battery is increased up to greater than or equal to about 200° C. within a couple of seconds. For example, the separator may have a thermal shrinkage ratio is less than or equal to about 10% when being exposed for about 1 hour at about 150° C. and is not ruptured when being allowed to stand for about 10 minutes at about 230° C. Furthermore, its elastic modulus may be greater than or equal to about 500 MPa and less than or equal to about 700 MPa and its hardness may be greater than or equal to about 25 N/mm$^2$ and less than or equal to about 35 N/mm$^2$, which exhibit shape maintenance.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A composition for forming a porous heat-resistant layer of a separator, the composition comprising:
    a monomer including a cross-linkable functional group, an oligomer including a cross-linkable functional group, a polymer including a cross-linkable functional group, or a mixture thereof;
    a non-cross-linking binder;
    a solvent;
    an initiator;
    first inorganic particles having an average particle diameter ($D_{50}$) X of about 300 nm to about 700 nm; and second inorganic particles having an average particle diameter ($D_{50}$) of 0.1X to 0.4X such that the second inorganic particles have an average particle diameter of 200 nm to 280 nm, wherein a weight ratio of the first inorganic particles to the second inorganic particles in the composition is about 7:3 to about 8.5:1.5, wherein a weight ratio of the monomer including a cross-linkable functional group, the oligomer including a cross-linkable functional group, the polymer including a cross-linkable functional group, or the mixture thereof to the non-cross-linking binder is about 2:8 to about 5:5, wherein the monomer including a cross-linkable functional group is a monomer represented by Chemical Formula 1, the oligomer including a cross-linkable functional group is an oligomer of the monomer represented by Chemical Formula 1, and the polymer including a cross-linkable functional group is a polymer of the monomer represented by Chemical Formula 1:

[Chemical Formula 1]

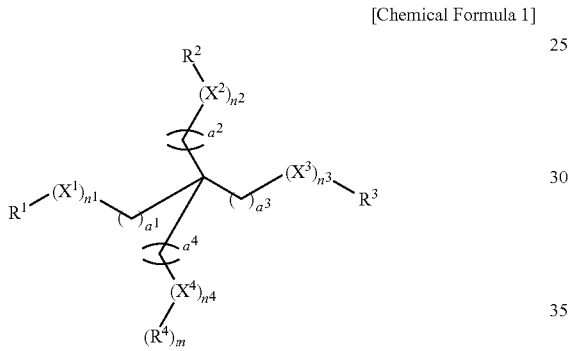

wherein in Chemical Formula 1, $X^1$ to $X^3$ are each an oxyethylene group, $X^4$ is an oxyethylene group or a C1 to C10 alkyl group, $R^1$ to $R^4$ are each independently a (meth)acrylate group, a hydroxy group, a carboxyl group, an ester group, a cyanate group, an isocyanate group, an amino group, a thiol group, a C1 to C10 alkoxy group, a vinyl group, or a heterocyclic group, $a^1$ to $a^4$ are each independently an integer of 1 to 10, and $n^1$ to $n^4$ are each independently an integer of 0 to 10, provided that:
at least one of $n^1$ to $n^4$ is an integer of 1 to 10,
when $X^4$ is the oxyethylene group, $n^4$ is an integer of 1 to 10 and m is 1, and
when $X^4$ is a C1 to C10 alkyl group, $n^4$ is 1 and m is 0.

2. The composition as claimed in claim 1, wherein the non-cross-linking binder includes a PVdF polymer, polymethylmethacrylate, polyacrylonitrile, polyvinylpyrrolidone, polyvinylacetate, polyethyleneoxide, cellulose acetate, cellulose acetate butyrate, cellulose acetate propionate, cyanoethylpullulan, cyanoethylpolyvinyl alcohol, cyanoethyl cellulose, cyanoethylsucrose, pullulan, carboxyl methyl cellulose, an acrylonitrile-butadiene-styrene polymer, or a mixture thereof.

3. A separator, comprising:
a porous substrate; and
a porous heat-resistant layer disposed on one surface or both surfaces of the porous substrate,
wherein the porous heat-resistant layer includes:
a cross-linking binder;
a non-cross-linking binder;

first inorganic particles having an average particle diameter ($D_{50}$) X of about 300 nm to about 700 nm; and
second inorganic particles having an average particle diameter ($D_{50}$) of 0.1X to 0.4X such that the second inorganic particles have an average particle diameter of 200 nm to 280 nm, wherein a weight ratio of the first inorganic particles to the second inorganic particles in the composition is about 7:3 to about 8.5:1.5, wherein a weight ratio of the monomer including a cross-linkable functional group, the oligomer including a cross-linkable functional group, the polymer including a cross-linkable functional group, or the mixture thereof to the non-cross-linking binder is about 2:8 to about 5:5, wherein the cross-linking binder is formed from a monomer represented by Chemical Formula 1, an oligomer of the monomer represented by Chemical Formula 1, a polymer of the monomer represented by Chemical Formula 1, or a mixture thereof:

[Chemical Formula 1]

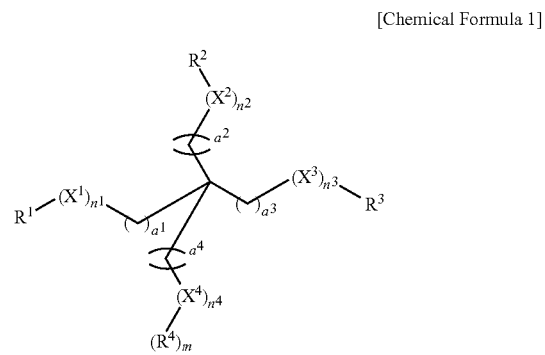

wherein, in Chemical Formula 1, $X^1$ to $X^3$ are each an oxyethylene group, $X^4$ is an oxyethylene group or a C1 to C10 alkyl group, $R^1$ to $R^4$ are each independently a (meth)acrylate group, a hydroxy group, a carboxyl group, an ester group, a cyanate group, an isocyanate group, an amino group, a thiol group, a C1 to C10 alkoxy group, a vinyl group, or a heterocyclic group, $a^1$ to $a^4$ are each independently an integer of 1 to 10, and $n^1$ to $n^4$ are each independently an integer of 0 to 10, provided that:
at least one of $n^1$ to $n^4$ is an integer of 1 to 10,
when $X^4$ is the oxyethylene group, $n^4$ is an integer of 1 to 10 and in is 1, and
when $X^4$ is a C1 to C10 alkyl group, $n^4$ is 1 and m is 0.

4. The separator as claimed in claim 3, wherein the non-cross-linking binder includes a PVdF polymer, polymethylmethacrylate, polyacrylonitrile, polyvinylpyrrolidone, polyvinylacetate, polyethyleneoxide, cellulose acetate, cellulose acetate butyrate, cellulose acetate propionate, cyanoethyl pullulan, cyanoethylpolyvinyl alcohol, cyanoethyl cellulose, cyanoethylsucrose, pullulan, carboxyl methyl cellulose, an acrylonitrile-butadiene-styrene polymer, or a mixture thereof.

5. The separator as claimed in claim 3, wherein rupture of the separator does not occur when allowed to stand for about 10 minutes at about 230° C.

6. The separator as claimed in claim 3, wherein an elastic modulus of the porous heat-resistant layer is greater than or equal to about 500 MPa and less than or equal to about 700

MPa, and hardness of the porous heat-resistant layer is greater than or equal to about 25 N/mm² and less than or equal to about 35 N/mm².

7. An electrochemical battery, comprising:
   a positive electrode;
   a negative electrode;
   the separator as claimed in claim 3; and
   an electrolyte.

8. The electrochemical battery as claimed in claim 7, wherein the electrochemical battery is a rechargeable lithium battery.

\* \* \* \* \*